United States Patent
Song et al.

(10) Patent No.: US 8,428,388 B2
(45) Date of Patent: Apr. 23, 2013

(54) IMAGE GENERATING APPARATUS AND METHOD FOR EMPHASIZING EDGE BASED ON IMAGE CHARACTERISTICS

(75) Inventors: Han-Sae Song, Seoul (KR); Hee-Chan Park, Seoul (KR); Min-Kyu Park, Seoul (KR); Young-Kwon Yoon, Seoul (KR); Yong-Gu Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 263 days.

(21) Appl. No.: 13/016,171

(22) Filed: Jan. 28, 2011

(65) Prior Publication Data

US 2011/0188774 A1 Aug. 4, 2011

(30) Foreign Application Priority Data

Jan. 29, 2010 (KR) .................. 10-2010-0008730

(51) Int. Cl.
*G06K 9/40* (2006.01)

(52) U.S. Cl.
USPC ........... 382/266; 382/274; 382/275; 382/282; 382/284; 358/3.26; 358/3.27; 358/537

(58) Field of Classification Search .............. 382/260, 382/266, 269, 274, 275, 282, 284; 358/3.26, 358/3.27, 537, 538, 540
See application file for complete search history.

(56) References Cited

U.S. PATENT DOCUMENTS

| | | | |
|---|---|---|---|
| 112,640 A | 3/1871 | Schreiner | |
| 154,828 A | 9/1874 | Bennett | |
| 5,081,692 A | 1/1992 | Kwon et al. | |
| 5,442,462 A * | 8/1995 | Guissin .................... 358/463 |
| 5,559,777 A * | 9/1996 | Maeda et al. ............... 369/47.5 |
| 5,825,937 A | 10/1998 | Ohuchi et al. | |
| 6,175,659 B1 | 1/2001 | Huang | |
| 6,937,282 B1 * | 8/2005 | Some et al. .................. 348/335 |
| 7,003,173 B2 | 2/2006 | Deshpande | |

(Continued)

FOREIGN PATENT DOCUMENTS

| JP | 2006-094419 | 4/2006 |
|---|---|---|
| JP | 3891928 | 12/2006 |

(Continued)

OTHER PUBLICATIONS

Ramponi et al.: "Rational Unsharp Masking Technique", Journal of Electronic Imaging, XP000750389, Apr. 1, 1998.
Buemi et al.: "Adaptive Sharpening with Overshoot Control", Image Analysis and Processing, XP019128221, Sep. 8, 2009.

*Primary Examiner* — Yosef Kassa
(74) *Attorney, Agent, or Firm* — The Farrell Law Firm, P.C.

(57) ABSTRACT

An image generating apparatus and method for emphasizing an edge, based on image characteristics by extracting an edge region from an input original image, and an edge gain indicating a degree for emphasizing the edge region and an edge threshold indicating a degree of complexity between pixels are calculated for each of a plurality of image regions of the original image. The extracted edge region is combined with the calculated edge gain. Thresholding is performed by adjusting the calculated edge threshold for the edge region combined with the edge gain, and the thresholding-applied edge region is combined with the original image to output a final image. By adaptively adjusting an edge gain and an edge threshold for a portion where an edge needs to be emphasized and the other portions in an image having multiple image characteristics, both edge emphasis and noise cancellation can be achieved together.

14 Claims, 7 Drawing Sheets

U.S. PATENT DOCUMENTS

| | | | |
|---|---|---|---|
| 7,155,067 B2 | 12/2006 | Jayant et al. | |
| 7,227,573 B2 * | 6/2007 | Stavely | 348/240.2 |
| 7,369,181 B2 | 5/2008 | Kang et al. | |
| 7,433,397 B2 * | 10/2008 | Garlepp et al. | 375/229 |
| 2006/0279660 A1 | 12/2006 | Ali | |
| 2009/0167904 A1 | 7/2009 | Matsushima | |

FOREIGN PATENT DOCUMENTS

| | | |
|---|---|---|
| JP | 2007-336258 | 12/2007 |
| JP | 2008-197437 | 8/2008 |
| WO | WO 2009/044348 | 4/2009 |

* cited by examiner

IMAGE GENERATING APPARATUS AND METHOD FOR EMPHASIZING EDGE BASED ON IMAGE CHARACTERISTICS

PRIORITY

This application claims priority under 35 U.S.C. §119(a) to a Korean Patent Application filed in the Korean Intellectual Property Office on Jan. 29, 2010 and assigned Serial No. 10-2010-8730, the disclosure of which is incorporated herein by reference.

BACKGROUND OF THE INVENTION

1. Field of the Invention

The present invention relates generally to an apparatus and method for emphasizing an edge in an image, and more particularly, to an image generating apparatus and method for emphasizing an edge in an image based on image characteristics, such as brightness variation, or contrast in the image, complexity, and so forth.

2. Description of the Related Art

Generally, edge region detection of an image is accomplished with an edge-detecting filter, alone or in combination with a noise canceling scheme.

Edge region detection using the edge detecting filter extracts an edge region by using an edge extracting filter such as a Sobel operator, a Canny edge detector, Laplacian filter or Laplacian of Gaussian filter, or the like, emphasizes the edge region by applying an edge gain to the extracted edge region, and applies the emphasized edge region to the original image, thus generating an edge-emphasized image. This method is one of several widely used methods to detect an edge region in a low-pass-filtered original image.

The edge region detection using both the edge detecting filter and the noise cancelling scheme extracts a high frequency of the original image by using a band pass filter, whereby noise is also extracted together with the edge region. Since this method also amplifies noise when applying the edge gain to the extracted edge region, it cancels the noise by using a Laplacian of Gaussian filter.

Alternatively, with a separately provided noise cancelling filter, noise may be previously cancelled prior to detection of the edge region in the original image. A thresholding scheme may also be used in which the edge region is detected in the original image and an edge value smaller than a predetermined threshold is removed such that the edge region can have only large edge values.

As such, an edge region is conventionally emphasized by using the edge detecting filter or both the edge detecting filter and the noise cancelling scheme.

However, when an edge is emphasized using the conventional methods, it is difficult to increase an edge gain due to accompanying amplification of noise in the original image and to cancel the noise suitably for respective regions of the original image having different image characteristics.

Moreover, in the original image, in case of a dark region having a small difference between the maximum brightness and the minimum brightness and a bright region having a large difference between the maximum brightness and the minimum brightness, if the edge gain is adjusted based on the bright region, an edge in the dark region is emphasized less than an edge in the bright region.

Furthermore, because there is usually more noise in the bright region than in the dark region, noise cancellation without consideration of brightness may excessively cancel the small noise in the dark region.

SUMMARY OF THE INVENTION

Accordingly, an aspect of the present invention is to provide an image generating apparatus and method for emphasizing an edge based on image characteristics in an original image.

According to an aspect of the present invention, there is provided an image generating apparatus for emphasizing an edge based on image characteristics. The image generating apparatus includes an edge extractor for extracting an edge region from an input original image, an edge gain calculator for calculating an edge gain indicating a degree for emphasizing the edge region for each of a plurality of image regions of the original image, an edge threshold calculator for calculating an edge threshold indicating a degree of complexity between pixels for each of the plurality of image regions of the original image, and a controller for combining the edge region extracted by the edge extractor with the edge gain calculated by the edge gain calculator, performing thresholding by adjusting the edge threshold calculated by the edge threshold calculator for the edge region combined with the edge gain, and combining the thresholding-applied edge region with the original image to output a final image.

According to another aspect of the present invention, there is provided an image generating method for emphasizing an edge based on image characteristics in an image generating apparatus. The image generating method includes extracting an edge region from an input original image, calculating an edge gain indicating a degree for emphasizing the edge region for each of a plurality of image regions of the original image, calculating an edge threshold indicating a degree of complexity between pixels for each of the plurality of image regions of the original image, combining the extracted edge region with the calculated edge gain, performing thresholding by adjusting the calculated edge threshold for the edge region combined with the edge gain, and combining the thresholding-applied edge region with the original image to output a final image.

BRIEF DESCRIPTION OF THE DRAWINGS

The above and other features and advantages of the present invention will be more apparent from the following detailed description when taken in conjunction with the accompanying drawings, in which.

DETAILED DESCRIPTION OF EMBODIMENTS OF THE PRESENT INVENTION

Hereinafter, embodiments of the present invention will be described in detail with reference to the accompanying drawings. In the following description and accompanying drawings, known functions and structures will not be described in detail if they may unnecessarily obscure the subject matter of the present invention.

Figure 1:
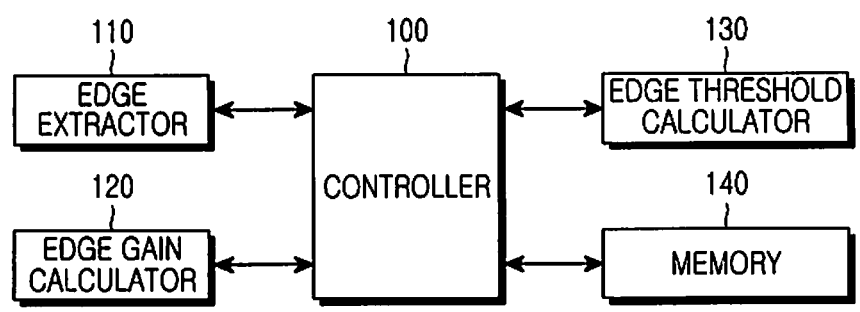
FIG. 1 is a block diagram of an image generating apparatus for emphasizing an edge based on image characteristics according to an embodiment of the present invention.

FIG. 1 is a block diagram of an image generating apparatus for emphasizing an edge based on image characteristics according to an embodiment of the present invention.

Referring to FIG. 1, an image generating apparatus according to an embodiment of the present invention may include a controller 100, an edge extractor 110, an edge gain calculator 120, an edge threshold calculator 130, and a memory 140.

Upon input of an original image, the controller 100 extracts an edge region from the input image through the edge extractor 110.

The controller 100 calculates an edge gain from the original image through the edge gain calculator 120, calculates an edge threshold through the edge threshold extractor 130, multiplies the calculated edge gain by the calculated edge region, and removes edge regions having an edge value smaller than the edge threshold in the edge-gain-multiplied edge region.

The controller 100 then combines the original image with the edge region from which the edge region having the smaller edge value than the threshold was removed, thus generating an edge-emphasized original image and storing the resulted image in the memory 140.

The edge extractor 110 extracts the edge region from the input original image. The edge extractor 110 uses a Band Pass Filter (BPF) such as a Laplacian filter.

The edge gain calculator 120 sets an arbitrary pixel patch region from the original image, calculates a brightness variation or contrast degree and a complexity degree in the set pixel patch region, and combines the contrast degree and the complexity degree, thus calculating an edge gain.

The edge threshold calculator 130 calculates a degree of complexity between pixels in the set pixel patch region and calculates the edge threshold by using the calculated degree of complexity.

The memory 140 stores the input original image and the edge-emphasized image.

In this way, by emphasizing the edge region taking account of a brightness and a complexity for respective regions having different image characteristics in the original image, an image where an edge is emphasized based on the image characteristics can be generated.

Figure 2:
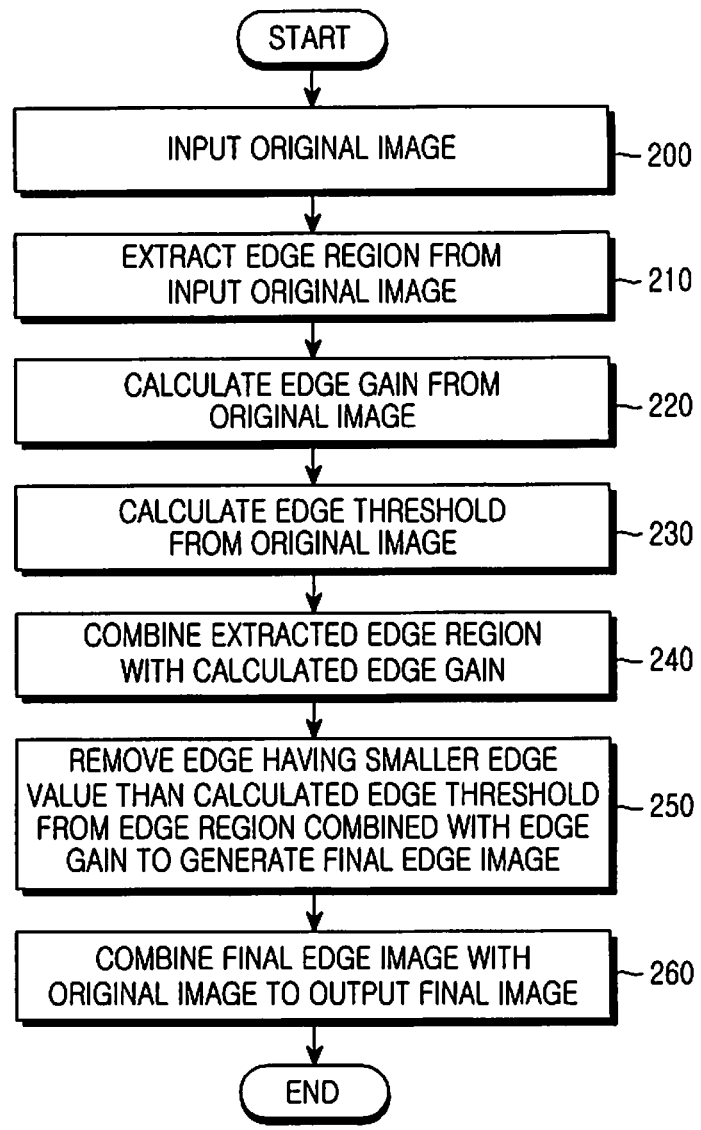
FIG. 2 is a flowchart illustrating a process of emphasizing an edge based on image characteristics by the image generating apparatus according to an embodiment of the present invention.

FIG. 2 is a flowchart illustrating a process of emphasizing an edge, based on image characteristics by the image generating apparatus, according to an embodiment of the present invention.

Referring to FIG. 2, upon input of an original image in step 200, the controller 100 extracts an edge region from the input original image through the edge extractor 110 in step 210. In step 220, the controller 100 calculates an edge gain from the original image through the edge gain calculator 120. A process of calculating the edge gain by the edge gain calculator 120 will be described in detail with reference to FIG. 3.

Figure 3:
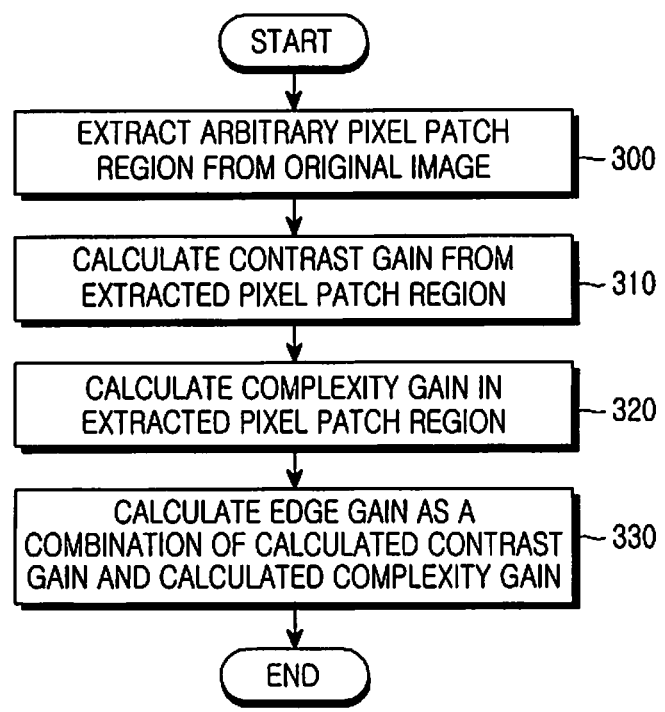
FIG. 3 is a flowchart illustrating a process of calculating an edge gain by an edge gain calculator according to an embodiment of the present invention.

FIG. 3 is a flowchart illustrating a process of calculating an edge gain by the edge gain calculator 120 according to an embodiment of the present invention.

Referring to FIG. 3, the edge gain calculator 120 extracts an arbitrary pixel patch region from the original image in step 300. The pixel patch region is composed of n×n pixels and may be preset by a user or by default, where n is an integer that is a positive integer.

The edge gain calculator 120 calculates a brightness variation or contrast gain indicating a contrast degree in the extracted pixel patch region in step 310, and calculates a complexity gain indicating a complexity degree in the extracted pixel patch region in step 320.

The edge gain calculator 120 calculates an edge gain as a combination of the calculated contrast gain and complexity gain in step 330.

Figure 4A:
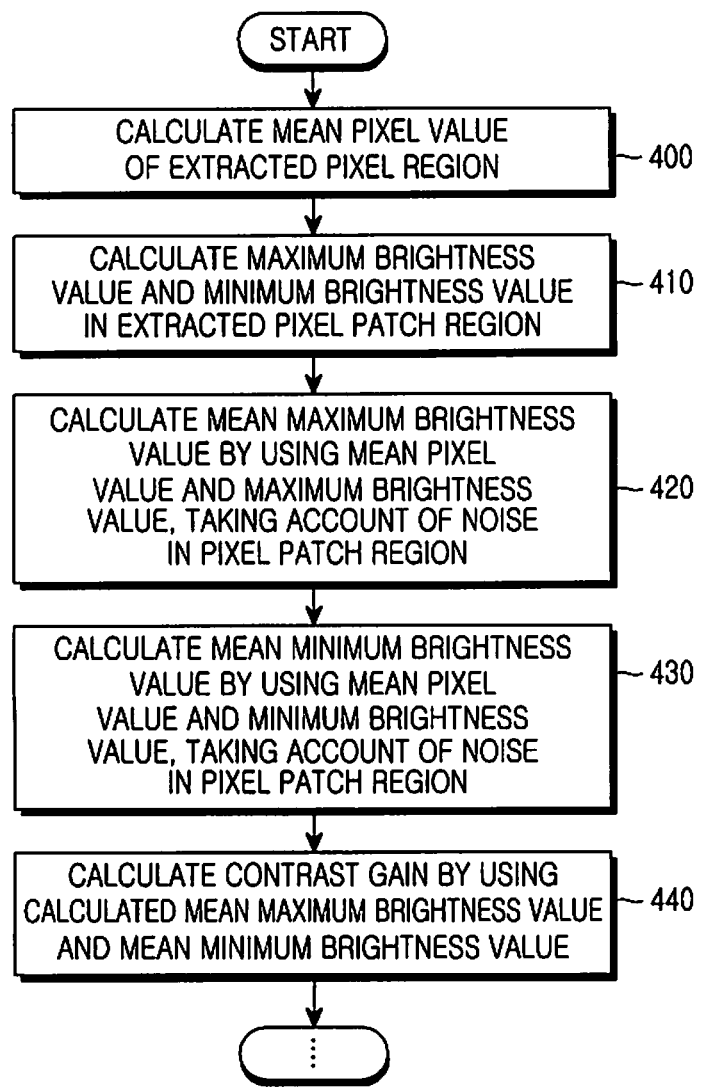
FIGS. 4A and 4B are flowcharts illustrating a process of calculating a brightness variation or contrast gain and a complexity gain to calculate an edge gain by combining the contrast gain and the complexity gain by the edge gain calculator according to an embodiment of the present invention.
Figure 4B:
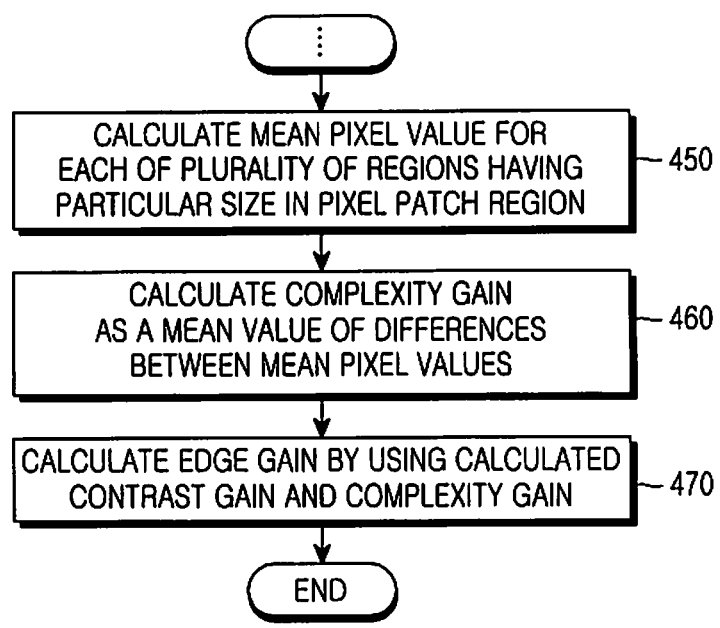

With reference to FIGS. 4A and 4B, a detailed description will be made of a process of calculating the contrast gain and the complexity gain and calculating the edge gain by combining the calculated contrast gain and complexity gain by the edge gain calculator 120.

FIG. 4A is a flowchart illustrating a process of calculating a contrast gain by the edge gain calculator 120 according to an embodiment of the present invention.

Referring to FIG. 4A, the edge gain calculator 120 calculates a mean (or average) pixel value of the extracted pixel patch region in step 400. For example, it is assumed that a 5×5-pixel patch region including 25 pixels is extracted from the original image.

The edge gain calculator 120 divides a sum of a pixel value of a $1^{st}$ pixel p1, a pixel value of a $2^{nd}$ pixel p2, a pixel value of a $3^{rd}$ pixel p3, ..., a pixel value of a $23^{rd}$ pixel p23, a pixel value of a $24^{th}$ pixel p24, and a pixel value of a $25^{th}$ pixel p25 by 25, that is, (the pixel value of p1+the pixel value of p2+pixel value of p3+ ... +the pixel value of p23+the pixel value of p24+the pixel value of p25)/25, thereby calculating a mean pixel value of the 5×5-pixel patch region.

In step 410, the edge gain calculator 120 calculates a maximum brightness value and a minimum brightness value in the pixel patch region.

In step 420, the edge gain calculator 120 calculates a mean maximum brightness value by using the mean pixel value and the maximum brightness value, taking account of noise in the pixel patch region.

For example, the edge gain calculator 120 calculates the mean maximum brightness value in the 5×5-pixel patch region by using a weighted value of the mean pixel value and a weighted value of the maximum brightness value, taking account of noise in the 5×5-pixel patch region. The mean maximum brightness value may be calculated by using Equation (1):

$$\text{meanhigh} = a \times \text{mean} + b \times M \qquad (1)$$

wherein M represents a maximum pixel brightness value in the 5×5-pixel patch region, meanhigh represents a mean maximum brightness value of the 5×5-pixel patch region, and mean represents a mean pixel value of the 5×5-pixel patch region. Herein, a+b=1 and a and b are numbers that are not negative.

The edge gain calculator 120 may sets a and b according to image characteristics in the 5×5-pixel patch region to calculate the mean maximum brightness value. Herein, a and b are set according to the degree of noise in the 5×5-pixel patch region.

In step 430, the edge gain calculator 120 calculates a mean minimum brightness value by using the mean pixel value and the minimum brightness value, taking account of noise in the pixel patch region.

For example, the edge gain calculator 120 calculates the mean minimum brightness value in the 5×5-pixel patch region by using a weighted value of the mean pixel value and a weighted value of the minimum brightness value, taking account of noise in the 5×5-pixel patch region. The mean minimum brightness value may be calculated by using Equation (2):

$$meanlow = a \times mean + b \times L \qquad (2),$$

wherein L represents a minimum pixel brightness value in the 5×5-pixel patch region, meanlow represents a mean minimum brightness value of the 5×5-pixel patch region, and mean represents a mean pixel value of the 5×5-pixel patch region. Herein, a+b=1 and a and b are numbers that are not negative.

The edge gain calculator 120 may set a and b according to image characteristics in the 5×5-pixel patch region to calculate the mean minimum brightness value. Herein, a and b are set according to the degree of noise in the 5×5-pixel patch region.

In step 440, the edge gain calculator 120 calculates the contrast gain by using the calculated mean maximum brightness value and mean minimum brightness value. The contrast gain may be calculated by using Equation (3):

$$ContrastGain = (meanhigh - meanlow) \times f(mean) \qquad (3),$$

Wherein a function f( ) is a function used for normalization according to brightness. For example, since a bright region in an image has a large contrast in the edge region and a dark region in the image has a small contrast in the edge region, a difference between the contrasts is reduced by using the function, thus normalizing the contrasts in the image.

The function f( ) is a monotonically non-increasing function in which a domain is a mean brightness value and a range is greater than 0. The function f( ) can be changed according to characteristics of a sensor.

FIG. 4B is a flowchart illustrating a process of calculating an edge gain after calculating a complexity gain by the edge gain calculator 120 according to an embodiment of the present invention.

Referring to FIG. 4B, the process continues in step 450 where the edge gain calculator 120 calculates a mean pixel value for each of a plurality of regions having a particular size in the pixel patch region, as will be described in detail with reference to FIGS. 5A and 5B.

Figures 5A, 5B:
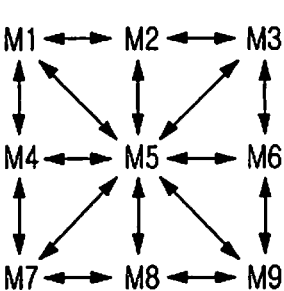
FIGS. 5A and 5B are diagrams for describing a process of calculating a mean pixel value for each of a plurality of regions having a particular size in a pixel path region by the edge gain calculator according to an embodiment of the present invention.

For example, as shown in FIG. 5A, in the 5×5-pixel patch region, a first 3×3-pixel patch region M1, a second 3×3-pixel patch region M2, . . . , and a ninth 3×3-pixel patch region M9 are set respectively, and a mean pixel value is calculated for each of the set 3×3-pixel patch regions.

In this way, calculated mean pixel values for respective 3×3-pixel patch regions are a mean pixel value of M1=(p1+p2+p3+p6+p7+p8+p11+p12+p13)/9, a mean pixel value of M2=(p2+p3+p4+p7+p8+p9+p12+p13+p14)/9, a mean pixel value of M3=(p3+p4+p5+p8+p9+p10+p13+p14+p15)/9, a mean pixel value of M4=(p6+p7+p8+p11+p12+p13+p16+p17+p18)/9, a mean pixel value of M5=(p7+p8+p9+p12+p13+p14+p17+p18+p19)/9, a mean pixel value of M6=(p8+p9+p10+p13+p14+p15+p18+p19+p20)/9, a mean pixel value of M7=(p11+p12+p13+p16+p17+p18+p21+p22+p23)/9, a mean pixel value of M8=(p12+p13+p14+p17+p18+p19+p22+p23+p24)/9, and a mean pixel value of M9=(p13+p14+p15+p18+p19+p20+p23+p24+p25)/9.

In step 460, the edge gain calculator 120 calculates a complexity gain as a mean value of differences between the mean pixel values calculated for the respective pixel patch regions.

For example, as shown in FIG. 5B, the edge gain calculator 120 calculates a mean value of differences between the mean pixel value of M1, the mean pixel value of M2, the mean pixel value of M3, . . . , the mean pixel value of M8, and the mean pixel value of M9. The calculated complexity gain (ComplexityGain) is (|mean pixel value of M1−mean pixel value of M5|+|mean pixel value of M2−mean pixel value of M5|+|mean pixel value of M3−mean pixel value of M5|+|mean pixel value of M4−mean pixel value of M5|+|mean pixel value of M6−mean pixel value of M5|+|mean pixel value of M7−mean pixel value of M5|+|mean pixel value of M8−mean pixel value of M5|+|mean pixel value of M9−mean pixel value of M5|+|mean pixel value of M1−mean pixel value of M2|+|mean pixel value of M2−mean pixel value of M3|+|mean pixel value of M3−mean pixel value of M6|+|mean pixel value of M6−mean pixel value of M9|+|mean pixel value of M9−mean pixel value of M8|+|mean pixel value of M8−mean pixel value of M7|+|mean pixel value of M7−mean pixel value of M4|+|mean pixel value of M4−mean pixel value of M1|)/16.

In step 470, the edge gain calculator 120 calculates an edge gain by using the calculated contrast gain and the calculated complexity gain. More specifically, the edge gain calculator 120 calculates the edge gain by multiplying the calculated contrast gain by the calculated complexity gain.

Going back to FIG. 2, in step 230, the controller 100 calculates an edge threshold from the original image through the edge threshold calculator 130. The edge threshold may be set larger than a value that is set according to the complexity degree of the edge region to suppress noise in the pixel patch region, or may be set smaller than the value to permit noise in the pixel path region.

Figure 6:
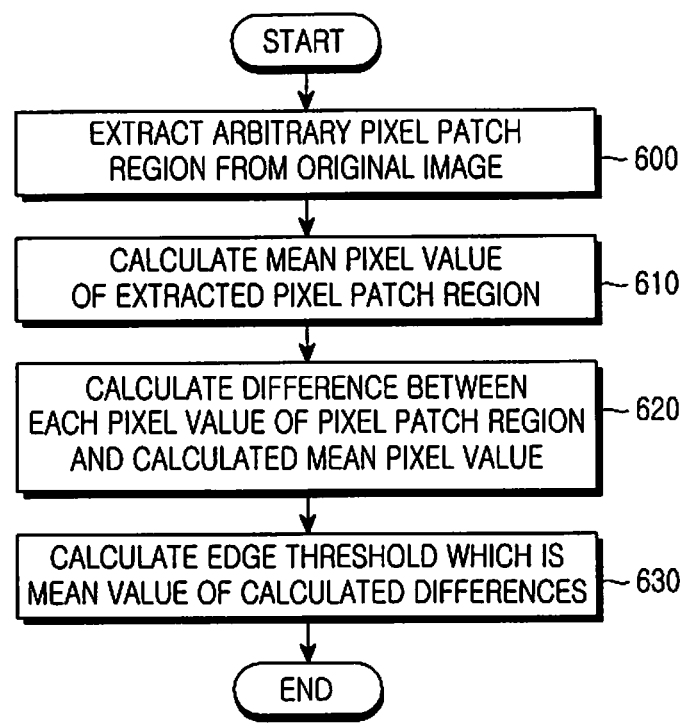
FIG. 6 is a flowchart illustrating a process of calculating an edge threshold by an edge threshold calculator according to an embodiment of the present invention.

A process of calculating the edge threshold by the edge threshold calculator 130 will be described in detail with reference to FIG. 6. FIG. 6 is a flowchart illustrating a process of calculating an edge threshold by the edge threshold calculator 130 according to an embodiment of the present invention.

Referring to FIG. 6, in step 600, the edge threshold calculator 130 extracts the arbitrary pixel patch region from the original image. In step 610, the edge threshold calculator 130 calculates a mean pixel value for the extracted pixel patch region. For example, a mean pixel value mean of the 5×5-pixel patch region may be (pixel value of p1+pixel value of p2+pixel value of p3+ . . . +pixel value of p23+pixel value of p24+pixel value of p25)/25.

The edge threshold calculator 130 calculates a difference between each pixel value of the pixel patch region and the calculated mean pixel value in step 620, and calculates the edge threshold by using a variation which is a mean value of the calculated differences in step 630. The variation (var) is (|pixel value of p1−mean|+|pixel value of p2−mean|+|pixel value of p3−mean|+|pixel value of p4−mean|+|pixel value of p5−mean|+|pixel value of p6−mean|+|pixel value of p7−mean|+|pixel value of p8−mean|+|pixel value of p9−mean|+|pixel value of p10−mean|+|pixel value of p11−mean|+|pixel value of p12−mean|+|pixel value of p13−mean|+|pixel value of p14−mean|+|pixel value of p15−mean|+|pixel value of p16−mean|+|pixel value of p17−mean|+|pixel value of p18−mean|+|pixel value of p19−mean|+|pixel value of p20−mean|+|pixel value of p21−mean|+|pixel value of p22−mean|+|pixel value of p23−mean|+|pixel value of p24−mean|+|pixel value of p25−mean|)/25. By using the variation (var), the edge threshold (EdgeThreshold)=G(var).

The function G( ) is a monotonically non-increasing function in which a domain is the variation (var) and a range is a real number which is not negative or an integer which is not negative.

In other words, since a large variation of the original image means a complex texture or an edge region, the edge threshold is set smaller than the preset value to cancel a small amount of noise in the edge region, thus permitting the noise in the edge region. On the other hand, a small variation of the original image means a flat texture or a non-edge region, and thus the edge threshold is set larger than the preset value to cancel noise in large amount, thus suppressing the noise in the edge region.

In step 240 in FIG. 2, the controller 100 combines extracted edge region with calculated edge gain. In step 250, the controller 100 removes edge having smaller edge value than calculated edge threshold from edge region combined with edge gain to generate final edge image. In step 260, the controller 100 combine final image with original image to output final image. Thus, the present invention adaptively adjusts an edge gain and an edge threshold for a portion where an edge needs to be emphasized and the other portions in an image having multiple image characteristics, thereby achieving both edge emphasis and noise cancellation at the same time.

While the present invention has been shown and described with reference to an embodiment thereof, it will be understood by those skilled in the art that various changes in form and details may be made therein without departing from the spirit and scope of the invention as defined by the appended claims. Therefore, the scope of the present invention should be defined by the appended claims and equivalents thereof, rather than the disclosed embodiment.

What is claimed is:

1. An image generating apparatus for emphasizing an edge based on image characteristics, the image generating apparatus comprising:
    an edge extractor for extracting an edge region from an input original image;
    an edge gain calculator for calculating an edge gain indicating a degree for emphasizing the edge region for each of a plurality of image regions of the original image;
    an edge threshold calculator for calculating an edge threshold indicating a degree of complexity between pixels for each of the plurality of image regions of the original image; and
    a controller for combining the edge region extracted by the edge extractor with the edge gain calculated by the edge gain calculator, performing thresholding by adjusting the edge threshold calculated by the edge threshold calculator for the edge region combined with the edge gain, and combining the thresholding-applied edge region with the original image to output a final image.

2. The image generating apparatus of claim 1, wherein the edge gain calculator calculates a brightness variation or contrast gain indicating a contrast degree for each of the plurality of image regions, calculates a complexity gain indicating a complexity degree for each of the plurality of image regions, and combines the calculated contrast gain with the calculated complexity gain to calculate the edge gain.

3. The image generating apparatus of claim 2, wherein the edge gain calculator calculates a mean pixel value, a maximum brightness value, and a minimum brightness value for each of the plurality of image regions, calculates a mean maximum brightness value by using the calculated mean pixel value and the calculated maximum brightness value, calculates a mean minimum brightness value by using the mean pixel value and the minimum brightness value, and calculates the contrast gain by using the calculated mean maximum brightness value and the calculated mean minimum brightness value.

4. The image generating apparatus of claim 1, wherein the edge gain calculator sets a plurality of patch regions having a predetermined size for each of the plurality of image regions, calculates a mean pixel value for each of the plurality of patch regions, and calculates mean value differences between the calculated mean pixel values as the complexity gain.

5. The image generating apparatus of claim 4, wherein the edge threshold calculator calculates differences between pixel values of respective pixels and the calculated mean pixel value for each of the plurality of image regions, and calculates the edge threshold by using a mean value of the calculated differences.

6. The image generating apparatus of claim 1, wherein the controller sets the edge threshold smaller than a preset value if the edge region combined with the edge gain has a high complexity degree to adjust a noise permission degree, and sets the edge threshold larger than the preset value if the edge region combined with the edge gain has a low complexity degree to adjust a noise suppression degree.

7. The image generating apparatus of claim 1, wherein the controller multiplies the extracted edge region by the calculated edge gain, removes an edge having a smaller edge value than the calculated edge threshold from the edge region multiplied by the edge gain, and combines the edge region from which the edge having the smaller edge value than the edge threshold is removed with the original image, thereby generating the edge-emphasized original image.

8. An image generating method for emphasizing an edge based on image characteristics in an image generating apparatus, the method comprising:
    extracting an edge region from an input original image;
    calculating an edge gain indicating a degree for emphasizing the edge region for each of a plurality of image regions of the original image;
    calculating an edge threshold indicating a degree of complexity between pixels for each of the plurality of image regions of the original image;
    combining the extracted edge region with the calculated edge gain;
    performing thresholding by adjusting the calculated edge threshold for the edge region combined with the edge gain;
    combining the thresholding-applied edge region with the original image; and
    outputting a final image.

9. The image generating method of claim 8, wherein calculating the edge gain comprises:
    calculating a brightness variation or contrast gain indicating a contrast degree for each of the plurality of image regions;
    calculating a complexity gain indicating a complexity degree for each of the plurality of image regions; and
    combining the calculated contrast gain with the calculated complexity gain to calculate the edge gain.

10. The image generating method of claim 9, wherein calculating the contrast gain comprises:
    calculating a mean pixel value, a maximum brightness value, and a minimum brightness value for each of the plurality of image regions;
    calculating a mean maximum brightness value by using the calculated mean pixel value and the calculated maximum brightness value and calculating a mean minimum brightness value by using the mean pixel value and the minimum brightness value; and calculating the contrast gain by using the calculated mean maximum brightness value and the calculated mean minimum brightness value.

11. The image generating method of claim 9, wherein calculating the complexity gain comprises:

setting a plurality of patch regions having a predetermined size for each of the plurality of image regions;

calculating a mean pixel value for each of the plurality of patch regions; and calculating a mean value differences between the calculated mean pixel values as the complexity gain.

12. The image generating method of claim 11, wherein calculating the edge threshold comprises:

calculating differences between pixel values of respective pixels and the calculated mean pixel value for each of the plurality of image regions; and calculating the edge threshold by using a mean value of the calculated differences.

13. The image generating method of claim 8, wherein performing thresholding comprises:

setting the edge threshold smaller than a preset value if the edge region combined with the edge gain has a high complexity degree to adjust a noise permission degree; and setting the edge threshold larger than the preset value if the edge region combined with the edge gain has a low complexity degree to adjust a noise suppression degree.

14. The image generating method of claim 8, wherein outputting the final image comprises:

multiplying the extracted edge region by the calculated edge gain and removing an edge having a smaller edge value than the calculated edge threshold from the edge region multiplied by the edge gain; and combining the edge region from which the edge having the smaller edge value than the edge threshold is removed with the original image, thereby generating the edge-emphasized original image.

* * * * *